Jan. 26, 1960 W. J. KELLEIGH 2,922,318
CAM DEVICE
Filed July 25, 1956
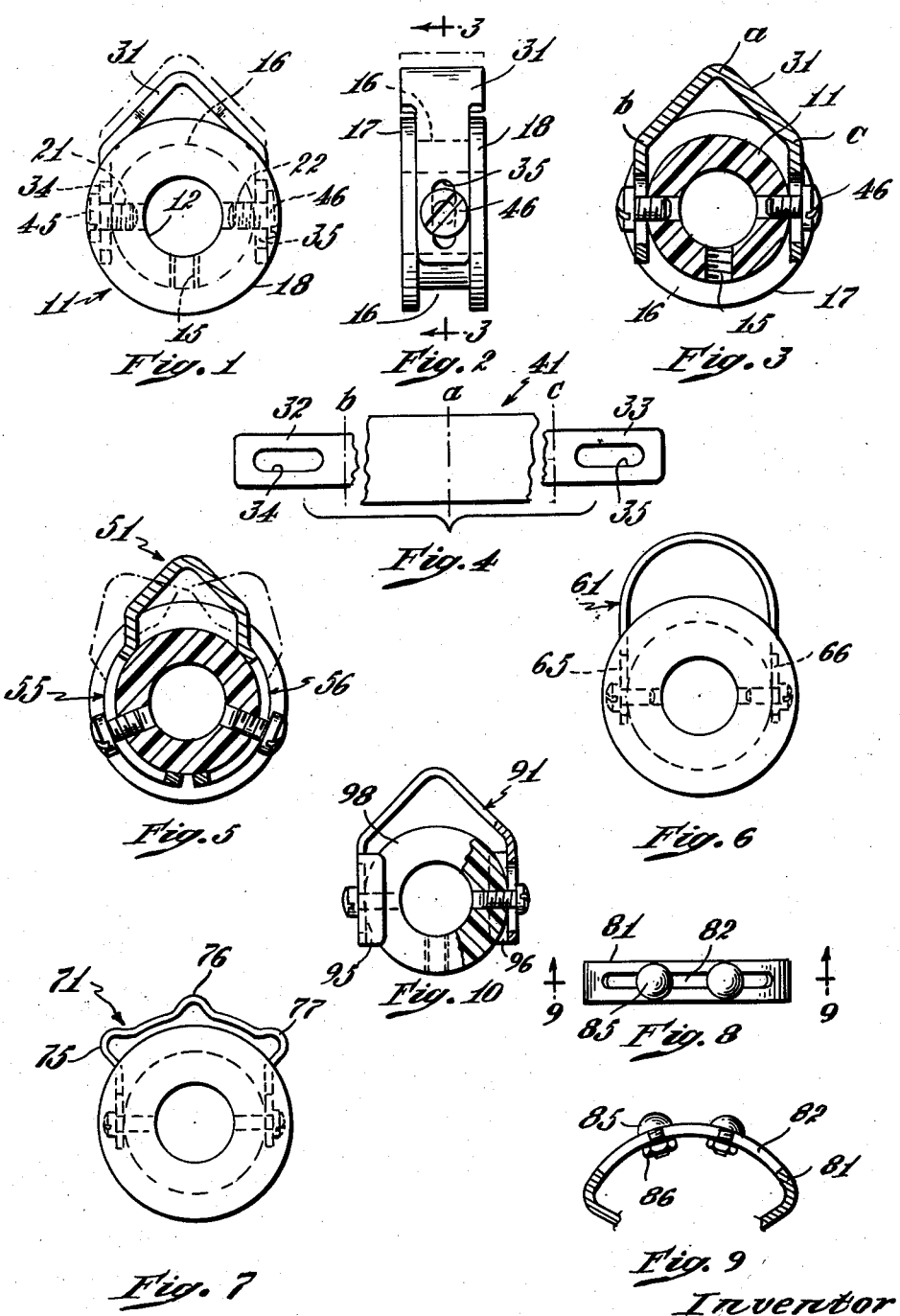
Inventor
Waldo J. Kelleigh
by Roberts, Cushman & Grover
Attys

United States Patent Office 2,922,318
Patented Jan. 26, 1960

2,922,318

CAM DEVICE

Waldo J. Kelleigh, Wayland, Mass., assignor to Electrical Apparatus Company, Inc., Boston, Mass., a corporation of Massachusetts Application July 25, 1956, Serial No. 599,943

11 Claims. (Cl. 74—568)

Objects of the present invention are to provide a cam device that can be made from stamped sheet metal, to provide such a device which can be readily adjusted as to radius and angular relation to its driving means, and to provide an inexpensive and yet accurate and strong cam device which is of such construction that its configuration can be easily adopted for various purposes by controlling its form prior to assembly, upon assembly, or during use with simple tools in a simple manner.

Briefly stated by way of a summary indicating its nature and substance, the invention is concerned with cam devices that comprise a collar which is adapted for mounting on a rotating driving member such as a shaft and which has on its periphery, preferably within a peripheral groove, fastening means such as threaded recesses or holes, and mounted on the collar a metal strip which is stamped from sheet metal and bent or otherwise formed to constitute a cam surface and which is fastened to the collar for example by screws through slots in the ends of the metal strip and engaging the threaded recesses of the collar.

The metal strip which constitutes the cam can be stamped from sheet metal in the form of a flat blank which can then be bent or otherwise formed to constitute a cam member, or the blank can be elastic and flexed upon mounting on the collar, to form the cam. The ends of the strip can be straight, or curved to conform to the periphery of the collar which allows adjustment of the cam angle relatively to the driving member such as the shaft. If the strip ends are flat, the slots permit adjustment of the height of the cam.

Instead of providing a single cam by means of the stamped strip, a multiple cam can be provided with a strip that has a plurality of protuberances, for example formed by pressing bumps thereinto, or by means of the heads of screws inserted through a longitudinal slot of the cam strip and fastened thereto by nuts on the inside thereof, or by means of screws threaded into tapped holes of the strip.

These and other objects and aspects of novelty of the invention will appear from the following description of several typical embodiments thereof illustrating its novel characteristics. This description refers to a drawing in which Fig. 1 is an end view of a cam device according to the invention;

Fig. 2 is a side elevation of the device according to Fig. 1;

Fig. 3 is a section on lines 3—3 of Fig. 2;

Fig. 4 is a view of the blank from which the cam strip is made;

Fig. 5 is a cross section similar to Fig. 3 of a modification with rounded end portions of the cam strip;

Fig. 6 is an end view, similar to Fig. 1, of a third modification wherein the cam strip is elastic;

Fig. 7 is an end view, similar to Figs. 1 and 6, of a fourth modification showing a cam strip with three subsidiary cam protuberances;

Fig. 8 is a top elevation of a rounded and slotted cam strip representative of a fifth embodiment;

Fig. 9 is a section on line 9—9 of Fig. 8; and

Fig. 10 is an end view, similar to Fig. 1 but partly in transverse section, of a modification of the invention.

In Figs. 1, 2 and 3 a collar or hub 11 of conventional shape has a bore 12 accommodating a driving means such as a shaft to which it can be fastened by way of a set screw that is inserted in the threaded hole 15. As indicated at 16, the collar has a peripheral groove formed by two flanges 17 and 18. The collar has further two threaded holes 21 and 22 which in this embodiment are aligned on a same diameter of the collar.

The cam proper is indicated at 31. It is formed from a blank 41 stamped from sheet metal in the shape shown in Fig. 4. In this instance the blank has two ears 32, 33, each with a slot 34 and 35, respectively. For purposes of this embodiment the blank is bent on the lines marked a, b, c in Figs. 3 and 4, such that the two end portions or ears 32, 33 become approximately parallel. The length of the end portions varies according to requirements, as indicated by showing them broken in Fig. 4.

The cam strip is mounted on the collar by inserting the ears in the groove 16, as shown in Fig. 2, and by fastening the screws 45, 46 into the holes 21 and 22, through the slots 34 and 35, respectively.

The height of the cam can be adjusted by loosening the screws 45, 46 and advancing or retracting the cam in its slots 34, 35, as indicated with dot and dash lines in Figs. 1 and 2. It will be evident that the cam strip is kept in alignment by means of its ears 32, 33 within the groove 16 of the collar 11.

The embodiment according to Fig. 5 is similar to that described above with reference to Figs. 1 to 4, with the difference that the end portions 55, 56 of the blank are bent to conform to the periphery of the groove 16, so that the cam 51 can be angularly adjusted, as indicated in dot and dash lines in Fig. 5.

The embodiment according to Fig. 6 incorporates a strip 61 made of elastic material such as spring steel or brass, the blank of which is otherwise shaped similar to that shown in Fig. 9. By means of slots 65 and 66 the cam can be mounted and adjusted as described above.

As shown in Fig. 7 the cam blank can be shaped, such as by pressing, to provide a cam piece 71 having a plurality of protuberances or bumps indicated at 75, 76, 77. Instead of incorporating the protuberances by pressing them into the cam strip blank, they can be provided as shown in Figs. 8 and 9, by means of a longitudinal slot 82 of a cam strip 81, and by means of bolts 85 which are fastened in the slot 82 by means of nuts 86.

Instead of making the cam symmetrical as herein shown, it can be made unsymmetrical or to any desired shape. The shape of spring strip cams according to Fig. 6 can be varied by making the strip of varying elasticity or thickness, and unsymmetrical cam shapes can be obtained in this manner by proper adjustment in the slots 65 and 66.

Instead of aligning the cam strip by means of engaging it in a groove such as indicated at 16 of Figs. 1 to 3, this purpose can be obtained in a different fashion by providing a strip 91 with four lateral ears such as indicated at 95, 96 of Fig. 10. These ears are bent inwardly and the collar 98 does in this instance not require a groove but can be merely a piece of tubing with three tapped holes.

I claim:

1. A cam device comprising: a collar adapted for mounting on a rotating driving member; a strip having fastening means at each end with the ends slidingly contacting said collar at diametrically opposite circularly peripheral regions thereof; and on said collar, coacting with said fastening means of said strip, means for mounting the strip on the collar; the length of the strip between its fastening means being longer than the periphery of the collar between its strip mounting means and the strip being bent and with said fastening means at each end mounted on said collar, with its bent portion extending from said peripheral region of the collar and its ends extending oppositely of said bend from said regions, so that the strip constitutes a continuous cam surface freely extending from the collar.

2. Device according to claim 1 wherein said strip carries a plurality of protuberances.

3. Device according to claim 2 wherein said protuberances are integrally pressed into said strip.

4. Device according to claim 2 wherein said strip has a single longitudinal slot carrying screws whose heads form said protuberances.

5. A cam device comprising: a collar having a peripheral groove with two substantially radial bores; a strip stamped and bent from sheet metal, the outer surface of which strip is essentially longer than the peripheral distance between said bores, the ends of which strip fit said groove, and which strip has a slot near each end; and means for fastening said strip through said slots to said collar at said bores such that the strip forms a continuous cam surface and is kept in radial alignment by said groove.

6. A cam device comprising: a collar having a peripheral groove with two threaded radial holes; a strip stamped and bent from elastic sheet metal of essentially rectangular shape which is essentially longer than the peripheral distance between said holes, and having at the shorter sides ears fitting said grooves, each ear having a slot; and two screws for fastening said strip through said slots to said collar at said threaded holes, such that the strip forms a continuous cam surface and is kept in radial alignment by said groove.

7. Device according to claim 6 wherein said ears are straight and essentially parallel.

8. Device according to claim 6 wherein said ears are rounded to conform to the diameter of said groove.

9. A cam device comprising: a collar adapted for mounting on a rotating driving member having two substantially radial bores; a strip stamped from sheet metal, of essentially rectangular shape, having in its middle portion a longitudinal slot and being longer than the peripheral distance between said bores of the collar; means near each end of the strip for fastening the strip to said bores to form a continuous cam on the collar; and adjustably fastened in said slot a plurality of protuberance means each forming a cam.

10. Device according to claim 9 wherein said protuberance means are bolts that are inserted in said slot with their heads on the outside.

11. A cam device comprising: a collar adapted for mounting on a rotating driving member; a strip having fastening means at each end, including longitudinal slots with screws therein; and on said collar, coacting with said fastening means of said strip, means for mounting the strip on the collar, including threaded holes for said screws; the length of the strip between its fastening means being longer than the periphery of the collar between its strip mounting means and the strip being bent and with said fastening means at each end mounted on said collar with its bent portion extending from the collar so that the strip constitutes a continuous cam surface on the collar.

References Cited in the file of this patent

UNITED STATES PATENTS

| | | |
|---|---|---|
| 346,592 | Landfear | Aug. 3, 1886 |
| 1,613,178 | Litchfield | Jan. 4, 1927 |
| 1,780,856 | Adam | Nov. 4, 1930 |
| 1,939,807 | Fibish | Dec. 19, 1933 |
| 2,571,818 | Blodgett | Oct. 16, 1951 |
| 2,621,539 | Eustis et al. | Dec. 16, 1952 |